(12) United States Patent
Harada et al.

(10) Patent No.: US 11,859,733 B2
(45) Date of Patent: Jan. 2, 2024

(54) VALVE DEVICE, FLUID CONTROL DEVICE, AND MANUFACTURING METHOD OF VALVE DEVICE

(71) Applicant: FUJIKIN INCORPORATED, Osaka (JP)

(72) Inventors: Akihiro Harada, Osaka (JP); Tomohiro Nakata, Osaka (JP); Takeru Miura, Osaka (JP); Michio Yamaji, Osaka (JP); Tadayuki Yakushijin, Osaka (JP); Keisuke Ishibashi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/630,400

(22) PCT Filed: Jun. 10, 2020

(86) PCT No.: PCT/JP2020/022873
§ 371 (c)(1),
(2) Date: Jan. 26, 2022

(87) PCT Pub. No.: WO2021/019922
PCT Pub. Date: Feb. 4, 2021

(65) Prior Publication Data
US 2022/0290764 A1    Sep. 15, 2022

(30) Foreign Application Priority Data
Jul. 31, 2019   (JP) .................................. 2019-141073

(51) Int. Cl.
*F16K 7/16*      (2006.01)
*F16K 31/122*    (2006.01)

(52) U.S. Cl.
CPC .............. *F16K 7/16* (2013.01); *F16K 31/122* (2013.01)

(58) Field of Classification Search
CPC .... F16K 7/16; F16K 31/122; Y10T 137/6109; Y10T 137/6113; Y10T 137/6157; Y10T 137/6154; Y10T 137/5994
(Continued)

(56) References Cited

U.S. PATENT DOCUMENTS 5,524,865 A * 6/1996 Uchisawa ................. F16K 7/14
                                                     251/359
9,841,770 B2 * 12/2017 Hirata ..................... F16K 31/06
(Continued)

FOREIGN PATENT DOCUMENTS

JP    2016161022 A    9/2016

*Primary Examiner* — Daphne M Barry
(74) *Attorney, Agent, or Firm* — Li & Cai Intellectual Property (USA) Office

(57) ABSTRACT

A valve device comprising: a flow passage block in which a flow passage is formed; a diaphragm configured to open and close the flow passage; an actuator configured to push down the diaphragm via a diaphragm holder; a tubular bonnet formed with an internal thread on an inner circumferential surface, the bonnet being configured to join the flow passage block and the actuator; a tubular adjusting screw threaded to the internal thread, the adjusting screw being configured to come into contact with the diaphragm holder to adjust a valve opening position of the diaphragm; and an annular lock nut configured to lock the adjusting screw by being screwed into the internal thread.

9 Claims, 9 Drawing Sheets

(58) Field of Classification Search
USPC .............................. 251/331; 137/859, 315.05
See application file for complete search history.

(56) References Cited

U.S. PATENT DOCUMENTS

| | | | |
|---|---|---|---|
| 10,145,479 B2* | 12/2018 | Kitano | ..................... F16K 7/14 |
| 2016/0047483 A1* | 2/2016 | Hirose | ............... F16K 27/0236 |
| | | | 137/602 |

* cited by examiner

VALVE DEVICE, FLUID CONTROL DEVICE, AND MANUFACTURING METHOD OF VALVE DEVICE

FIELD OF THE DISCLOSURE

The present invention relates to a valve device, a fluid control device, and a manufacturing method of the valve device.

BACKGROUND OF THE DISCLOSURE

JP2016-161022A discloses a valve device including a flow passage block in which a flow passage is formed, a diaphragm that opens and closes the flow passage, an actuator that pushes down the diaphragm via a diaphragm holder, and a bonnet that joins the flow passage block and the actuator.

SUMMARY OF THE DISCLOSURE

However, with the valve device disclosed in JP2016-161022A, there is a problem in that a flow rate of fluid flowing through the flow passage when the diaphragm is fully opened is varied due to dimensional variations of respective members forming the valve device. Thus, when the valve device is to be assembled, it is required to adjust a Cv value related to the flow rate. Here, in JIS standards, the Cv value is defined as a flow rate value expressing, in US gallon/min, a flow rate of water when the water of 60 degrees Fahrenheit flows at a pressure difference of 1 Psi in a specific operation range.

The present invention has been conceived in light of the circumstances described above, and an object thereof is to provide a valve device capable of adjusting a Cv value during assembly, a fluid control device, and a manufacturing method of the valve device.

According to an aspect of the present invention, provided is a valve device including: a flow passage block in which a flow passage is formed; a diaphragm configured to open and close the flow passage; a diaphragm holder configured to hold the diaphragm; an actuator configured to push down the diaphragm via the diaphragm holder; a tubular bonnet formed with an internal thread on an inner circumferential surface, the tubular bonnet being configured to join the flow passage block and the actuator; a tubular position adjusting member threaded to the internal thread, the tubular position being configured to come into contact with the diaphragm holder to adjust a valve opening position of the diaphragm; and an annular lock nut configured to lock the position adjusting member by being screwed into the internal thread.

According to another aspect of the present invention, provided is a manufacturing method of the valve device for manufacturing the valve device including: a diaphragm arranging step of arranging a diaphragm to a flow passage block in which a flow passage is formed, the diaphragm being configured to open and close the flow passage; a bonnet attaching step of attaching a tubular bonnet to the flow passage block, the bonnet being formed with an internal thread on an inner circumferential surface thereof; a diaphragm-holder arranging step of arranging a diaphragm holder on the bonnet so as to come into contact with the diaphragm; a valve-opening-position adjusting step of adjusting a valve opening position of the diaphragm via the diaphragm holder by threading a tubular position adjusting member to the internal thread; a locking step of locking the position adjusting member by screwing an annular lock nut to the internal thread; and an actuator attaching step of attaching an actuator to the bonnet, the actuator being configured to push down the diaphragm via the diaphragm holder.

According to the aspect of the present invention, it is possible to adjust a Cv value during assembly.

DETAILED DESCRIPTION OF THE EXEMPLARY EMBODIMENTS

In the following, an embodiment of the present invention (hereinafter, referred to as "this embodiment") will be described with reference to the attached drawings. In this description, the same reference signs are given to the same components throughout the description.

A valve device 1 according to this embodiment will be described first with reference to FIGS. 1 to 4.

Figure 1:
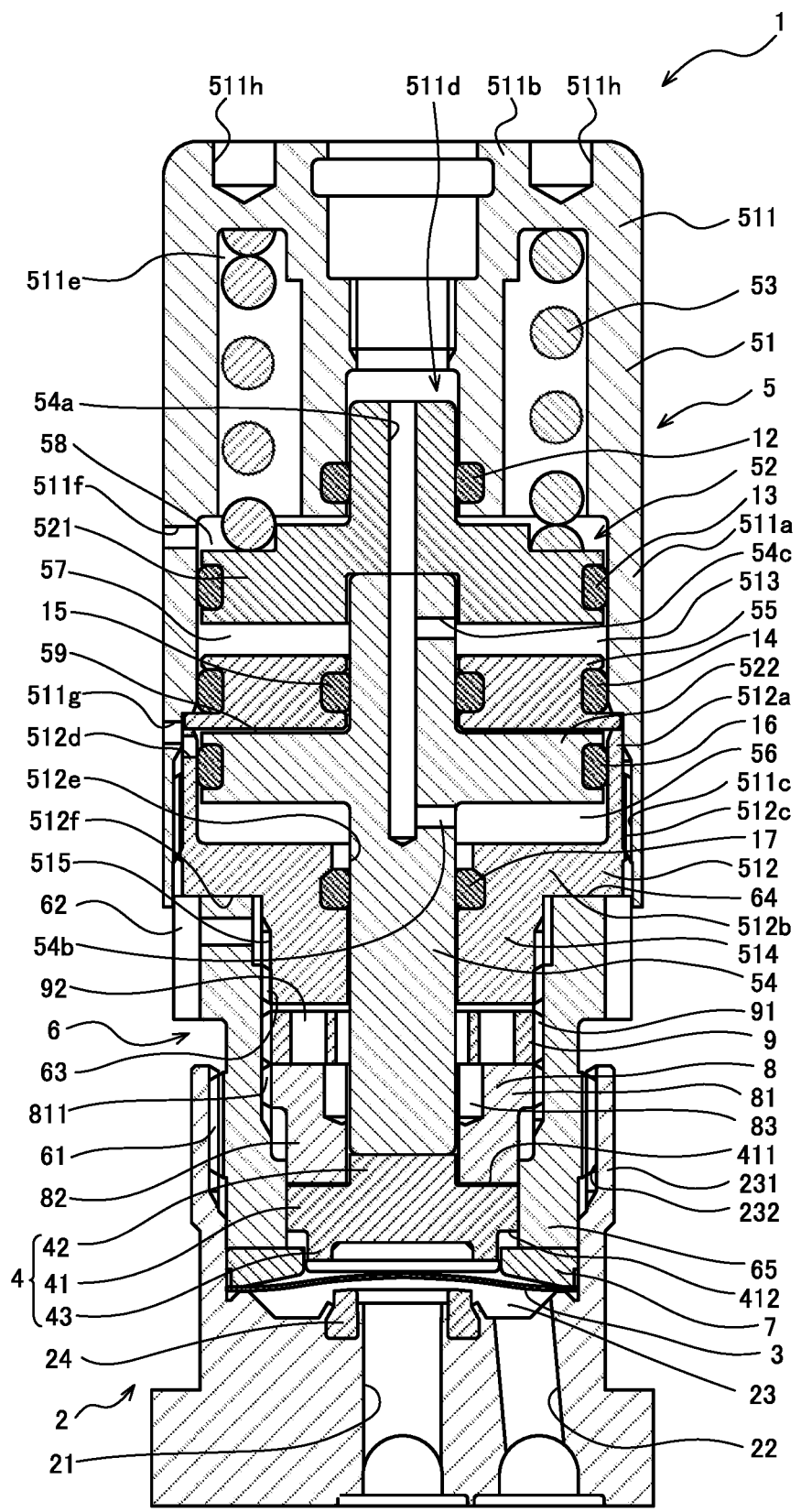
FIG. 1 is a sectional view showing a valve device according to an embodiment of the present invention.
Figure 2:
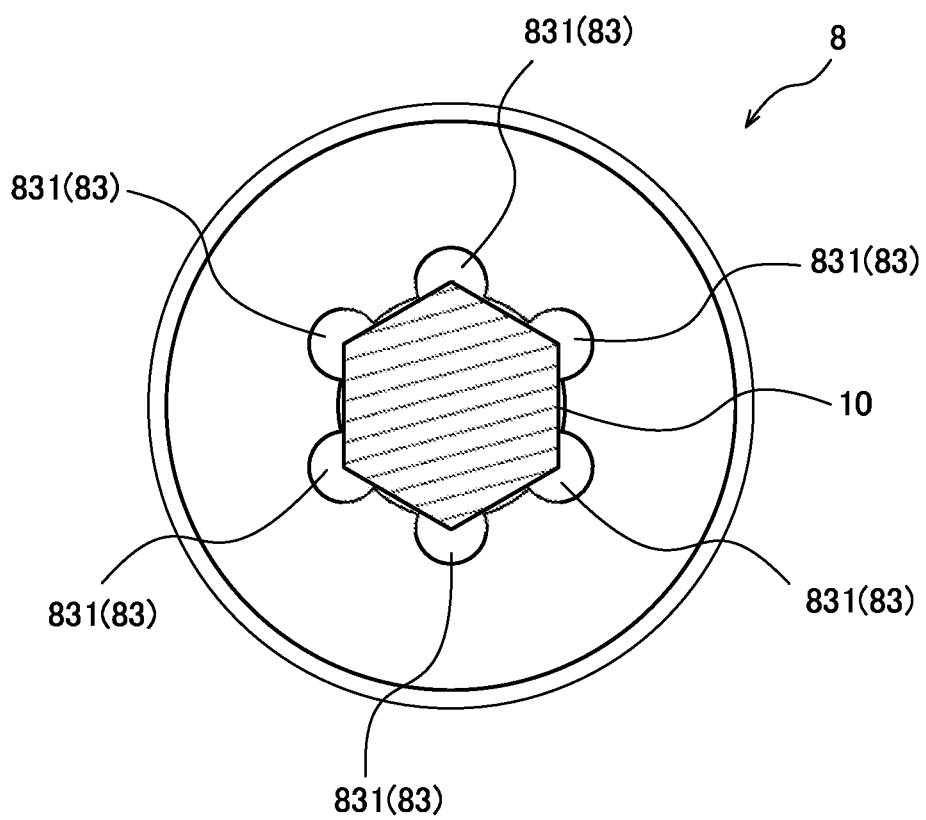
FIG. 2 is a top view showing an adjusting screw and a first rotary jig for rotating the adjusting screw.
Figure 3:
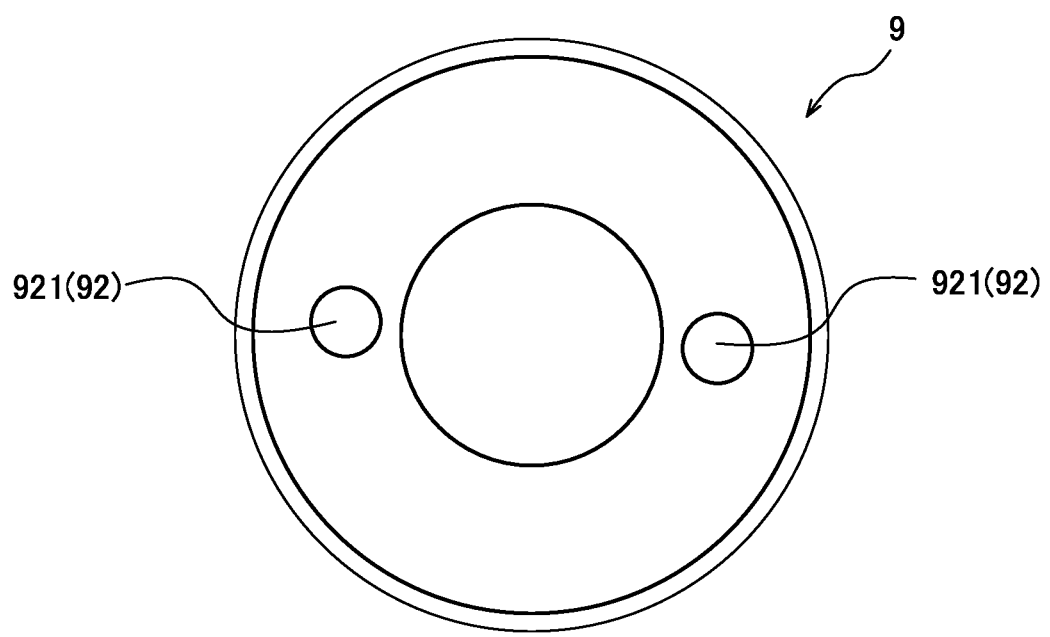
FIG. 3 is a top view showing a lock nut.
Figure 4A:
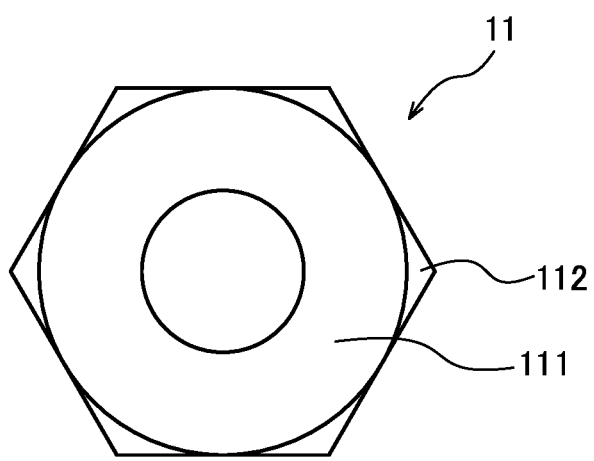
FIG. 4 is a schematic view showing a second rotary jig for rotating the lock nut, in which (a) is a schematic top view of the second rotary jig, and (b) is a schematic sectional view of the second rotary jig.
Figure 4B:
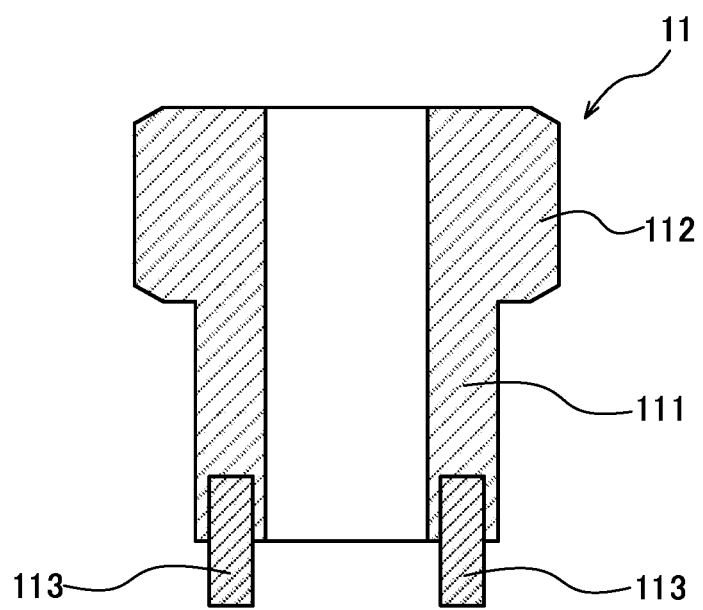

FIG. 1 is a sectional view showing the valve device 1. FIG. 2 is a top view showing an adjusting screw 8 and a first rotary jig 10 for rotating the adjusting screw 8. FIG. 3 is a top view showing a lock nut 9. FIG. 4 is a schematic view showing a second rotary jig 11 for rotating the lock nut 9, in which (a) is a schematic top view of the second rotary jig 11, and (b) is a schematic sectional view of the second rotary jig 11.

The valve device 1 according to this embodiment is provided in a fluid control device (not shown) used for manufacture of a semiconductor. The fluid control device is used for a thin film formation step for forming a predetermined thin film on a substrate such as a semiconductor wafer, etc. by an ALD (Atomic Layer Deposition) process.

As shown in FIG. 1, the valve device 1 is provided with a flow passage block 2, a diaphragm 3, a diaphragm holder 4, an actuator 5 serving as a driving portion, a bonnet 6, a spacer 7, and the adjusting screw 8 and the lock nut 9 serving as position adjusting members. The valve device 1 is an air-operated valve that opens the diaphragm 3 by introducing driving air serving as driving fluid into the actuator 5.

The flow passage block 2 has, as a flow passage, a fluid inflow flow passage 21, a fluid outflow flow passage 22, and a recessed portion 23 for receiving the bonnet 6. One end (an upper end in FIG. 1) of the fluid inflow flow passage 21 is communicated with one end (the upper end in FIG. 1) of the fluid outflow flow passage 22 through the recessed portion 23. A ring-shaped valve seat 24 is provided on a peripheral edge of the one end of the fluid inflow flow passage 21. The flow passage block 2 is provided with a circumferential wall 231 forming the recessed portion 23. On the recessed portion 23, an internal thread 232 that is to be threaded with the bonnet 6 is formed.

The diaphragm 3 is a valve body that opens and closes the fluid inflow flow passage 21 by being separated away from the valve seat 24 or by being pressed against the valve seat 24. The diaphragm 3 is a diaphragm member that separates the flow passage side and the actuator 5 side. In addition, the diaphragm 3 is formed to have an arc shape raised toward the actuator 5 side (the upper side in FIG. 1) in a natural state, and is made of, for example, a nickel alloy thin plate, etc. In general, the diaphragm 3 is held against the valve seat 24 by the diaphragm holder 4.

The diaphragm holder 4 is a holding member for holding the diaphragm 3 against the valve seat 24. The diaphragm holder 4 is accommodated in the bonnet 6. In addition, the diaphragm holder 4 has: a disc-shaped holder main body 41 serving as a guided portion; a disc-shaped upper projecting portion 42 that projects from the holder main body 41 toward the actuator 5 side (the upper side in FIG. 1) and that has a diameter that is smaller than that of the holder main body 41; and a disc-shaped lower projecting portion 43 serving as an insertion portion that projects from the holder main body 41 toward the flow passage block 2 side (the lower side in FIG. 1) and that has a diameter that is smaller than that of the holder main body 41 but larger than that of the upper projecting portion 42. The holder main body 41, the upper projecting portion 42, and the lower projecting portion 43 are formed coaxially.

The holder main body 41 is formed with an upper surface 411 serving as contact surface and a lower surface 412 serving as a movement restricting surface on the opposite side from the upper surface 411. The upper surface 411 is formed so as to be located at the outer side of the upper projecting portion 42 and so as to face an end surface (a lower end surface in FIG. 1) of the adjusting screw 8 on the flow passage block 2 side. The lower surface 412 is formed so as to be located at the outer side of the lower projecting portion 43 and so as to face an end surface (an upper end surface in FIG. 1) of the spacer 7 on the actuator 5 side.

In addition, in this embodiment, the lower projecting portion 43 is provided on the holder main body 41 by being fitted thereto. However, the present invention is not limited thereto, and for example, the lower projecting portion 43 may be formed integrally with the holder main body 41.

The actuator 5 causes the diaphragm 3 to be pressed against or separated away from the valve seat 24 via the diaphragm holder 4 accommodated in the bonnet 6, and thereby, the fluid inflow flow passage 21 is communicated with or shut off from the fluid outflow flow passage 22. The actuator 5 has a case 51 that is provided above the bonnet 6, a piston 52 that is slidably accommodated in the case 51, a coil spring 53 serving as a biasing member that pushes the piston 52 against the flow passage block 2 side, and a stem 54 that is moved in the axial direction (the vertical direction in FIG. 1) cooperatively with the piston 52.

The case 51 is a frame member for accommodating the piston 52 and the coil spring 53. The case 51 has a first case 511 serving as an upper having a bottomed cylindrical shape and a second case 512 serving as a lower that is joined with the first case 511 by being threaded thereto. The piston 52 is slidably accommodated in an accommodating space 513 that is formed by joining the first case 511 and the second case 512. The coil spring 53 is accommodated above the piston 52.

The first case 511 has a cylindrical circumferential wall 511a and a columnar top wall 511b that is provided on one end (the upper end in FIG. 1) of the circumferential wall 511a. On an inner circumferential surface of other end (lower end in FIG. 1) of the circumferential wall 511a, an internal thread 511c that is threaded to the second case 512 is formed. At the center of the top wall 511b, a stem guide hole 511d is formed so as to penetrate through in the axial direction (the vertical direction in FIG. 1) of the stem 54. The driving air is introduced into the actuator 5 from a driving-air supply control unit (not shown) via the stem guide hole 511d.

In the top wall 511b, a ring-shaped groove 511e serving as a spring accommodating chamber for accommodating the coil spring 53 is formed so as to surround the stem guide hole 511d. The coil spring 53 is accommodated in the ring-shaped groove 511e in a compressed state such that one end (the upper end in FIG. 1) thereof is in contact with a bottom portion of the ring-shaped groove 511e and other end (lower end in FIG. 1) thereof is in contact with a first piston 521 of the piston 52, which will be described later.

In the circumferential wall 511a, a through hole 511f and a through hole 511g for venting air are formed by penetrating through the circumferential wall 511a in the radial direction so as not to interfere with the internal thread 511c. The through hole 511g is located below the through hole 511f. In the top wall 511b, a pair of engagement holes 511h with which a third rotary jig for rotating the actuator 5 is to be engaged are formed so as not to interfere with the stem guide hole 511d.

The second case 512 has: a cylindrical circumferential wall 512a; a disc-shaped bottom wall 512b provided on one end (lower end in FIG. 1) of the circumferential wall 512a; and a cylindrical extended portion 514 that extends from the bottom wall 512b toward the flow passage block 2 side (the lower side in FIG. 1). On an outer circumferential surface of the circumferential wall 512a, an external thread 512c that is threaded to the internal thread 511c is formed. In the circumferential wall 512a, a through hole 512d for venting air is formed by penetrating through the circumferential wall 512a in the radial direction so as not to interfere with the external thread 512c. The through hole 511g of the first case 511 is communicated with the through hole 512d of the second case 512.

In the bottom wall 512b and the extended portion 514, a through hole 512e into which the stem 54 is inserted is formed. On an outer circumferential surface of the extended portion 514, an external thread 515 that is threaded to the bonnet 6 is provided. The bottom wall 512b is formed with a ring-shaped flat contact surface 512f that is located at the outer circumferential side from the extended portion 514 so as to face the bonnet 6.

The piston 52 has the first piston 521 serving as an upper piston and a second piston 522 serving as a lower that is located below the first piston 521 in FIG. 1.

A counter plate 55 that is located between the first piston 521 and the second piston 522 is fixed on an inner circumferential surface of the first case 511. A through hole through which the stem 54 is inserted is formed at the center of the counter plate 55.

A first air introduction chamber 56 is formed between the second piston 522 and the second case 512. A second air introduction chamber 57 is formed between the first piston 521 and the counter plate 55.

One end (the upper end in FIG. 1) of the stem 54 is inserted into the stem guide hole 511d of the first case 511. The stem 54 is formed with an axial direction flow passage 54a, a first radial flow passage 54b, and a second radial flow passage 54c for introducing the driving air into the first air introduction chamber 56 and the second air introduction chamber 57. In addition, in this embodiment, the stem 54 has a first shaft unit that extends upwards from the center portion of the first piston 521 and a second shaft unit that is formed separately from the first shaft unit and that extends in the vertical direction from the center portion of the second piston 522. However, the present invention is not limited thereto, and for example, the stem 54 may have a shaft unit that is formed of the first shaft unit and the second shaft unit in an integral form.

The axial direction flow passage 54a is communicated with the stem guide hole 511d. The first radial flow passage 54b is formed on a tip end (a lower end in FIG. 1) of the axial direction flow passage 54a, and thereby, the axial direction flow passage 54a is communicated with the first air introduction chamber 56. The second radial flow passage 54c is formed in the vicinity of the center portion of the axial direction flow passage 54a, and thereby, the axial direction flow passage 54a is communicated with the second air introduction chamber 57.

A first communicating chamber 58 is formed between the first piston 521 and the first case 511. The first communicating chamber 58 is communicated with the outside through the through hole 511f. A second communicating chamber 59 is formed between the second piston 522 and the counter plate 55. The second communicating chamber 59 is communicated with the outside through the through hole 511g and the through hole 512d.

An O ring 12 is interposed between the stem guide hole 511d and one end of the stem 54. An O ring 13 is interposed between the first piston 521 and the first case 511. An O ring 14 is interposed between the counter plate 55 and the first case 511. An O ring 15 is interposed between the counter plate 55 and the stem 54. An O ring 16 is interposed between the second piston 522 and the second case 512. An O ring 17 is interposed between the stem 54 and the through hole 512e.

The bonnet 6 is a cylindrical joint member that joins the flow passage block 2 and the actuator 5. The diaphragm holder 4, the adjusting screw 8, and the lock nut 9 are accommodated in the bonnet 6.

On an outer circumferential surface of the bonnet 6, an external thread 61 that is threaded to the internal thread 232 of the recessed portion 23 of the flow passage block 2 is formed. With such a configuration, the bonnet 6 is attached to the flow passage block 2 by threading the internal thread 232 and the external thread 61 together. In addition, an outer circumferential surface of the bonnet 6 is provided with a hexagonal projected portion 62 that can be engaged with monkey wrench, etc. The hexagonal projected portion 62 is located on the actuator 5 side (in other words, above the external thread 61) from the external thread 61.

An inner circumferential surface of the bonnet 6 located on the actuator 5 side (above in FIG. 1) is formed with an internal thread 63. The adjusting screw 8, the lock nut 9, and the extended portion 514 of the actuator 5 are threaded to the internal thread 63 in this order.

An upper end of the bonnet 6 is formed with a ring-shaped flat positioning surface 64 that faces the contact surface 512f of the actuator 5. By threading the external thread 515 of the extended portion 514 and the internal thread 63 of the bonnet 6, it is possible to screw the extended portion 514 of the actuator 5 into the inner circumferential surface of the bonnet 6 until the contact surface 512f and the positioning surface 64 are brought into contact. With such a configuration, the actuator 5 is positioned by the contact between the contact surface 512f and the positioning surface 64.

On a lower end of the bonnet 6 serving as an end portion located on the flow passage block 2 side (downward in FIG. 1), a ring-shaped annular portion 65 having the inner diameter that is smaller than the inner diameter of the internal thread 63 is formed. The holder main body 41 of the diaphragm holder 4 is guided in the vertical direction by an inner circumferential surface of the annular portion 65. The bonnet 6 is formed such that the internal thread 63 and the annular portion 65 do not overlap with each other in the vertical direction.

The ring-shaped spacer 7 having the inner diameter that is smaller than the inner diameter of the annular portion 65 is provided between the lower end of the bonnet 6 and a bottom surface of the recessed portion 23 of the flow passage block 2. An outer circumferential edge of the diaphragm 3 is retained between the spacer 7 and the bottom surface of the recessed portion 23 and is fixed by screwing the bonnet 6 into the internal thread 232 of the recessed portion 23. The lower projecting portion 43 of the diaphragm holder 4 that is brought into contact with the diaphragm 3 is inserted into an inner circumferential side of the spacer 7.

The adjusting screw 8 is a cylindrical position adjusting member for adjusting a valve opening position of the diaphragm 3 via the diaphragm holder 4 correspondingly to a screwed amount the adjusting screw 8 with respect to the internal thread 63 of the bonnet 6. Here, the valve opening position of the diaphragm 3 refers to the position of the apex of the diaphragm 3. In addition, the adjusting screw 8 is provided along the vertical direction between the lock nut 9 and the diaphragm holder 4. In this embodiment, the stem 54 of the actuator 5 and the upper projecting portion 42 of the diaphragm holder 4 are inserted in an inner circumferential side of the adjusting screw 8 so as to come into contact with each other. However, the present invention is not limited thereto, and for example, either one of the stem 54 and the upper projecting portion 42 may be inserted into the inner circumferential side of the adjusting screw 8.

The adjusting screw 8 has: a cylindrical large-diameter portion 81 serving as a threaded portion that is threaded to the internal thread 63; and a cylindrical small-diameter portion 82 that is located at the flow passage block 2 side (downward in FIG. 1) of the large-diameter portion 81 and that has the outer diameter that is smaller than the outer diameter of the large-diameter portion 81. The large-diameter portion 81 and the small-diameter portion 82 are formed coaxially.

On an outer circumferential surface of the large-diameter portion 81, an external thread 811 that is threaded to the internal thread 63 of the bonnet 6 is formed. An end surface (an upper end surface in FIG. 1) of the large-diameter portion 81 on the actuator 5 side is in contact with the lock nut 9.

The small-diameter portion 82 is provided such that a tip end (a lower end in FIG. 1) of the small-diameter portion 82 is inserted into the annular portion 65 of the bonnet 6. An end surface (a lower end surface in FIG. 1) of the small-diameter portion 82 on the flow passage block 2 side is in contact with the upper surface 411 serving as contact surface of the holder main body 41 of the diaphragm holder 4.

As shown in FIGS. 1 and 2, on an inner circumferential surface of the adjusting screw 8, first engagement portions 83 to which the first rotary jig 10 for rotating the adjusting screw 8 is to be engaged are formed. As shown in FIG. 2, the first engagement portions 83 are formed of six semicircular recessed grooves 831 that are formed in the inner circumferential surface of the adjusting screw 8 at predetermined intervals in a top view. The first rotary jig 10 is a hexagonal wrench. Corner portions of the first rotary jig 10 can respectively be received in the six recessed grooves 831.

In this embodiment, the recessed grooves 831 are provided so as to extend to the small-diameter portion 82 by penetrating through the large-diameter portion 81 in the vertical direction. However, the present invention is not limited thereto, and for example, the recessed grooves 831 may be provided so as to penetrate only through the large-diameter portion 81 in the vertical direction, or the large-diameter portion 81 may be provided only at a part of the large-diameter portion 81 in the vertical direction.

As the adjusting screw 8 is rotated in one direction (for example, in the clockwise direction) by using the first rotary jig 10, the adjusting screw 8 is moved toward the flow passage block 2 side (downward in FIG. 1) while being screwed into the internal thread 63 of the bonnet 6. By doing so, the diaphragm holder 4 is moved toward the flow passage block 2 side (downward in FIG. 1) together with the adjusting screw 8. As the diaphragm 3 is pushed toward the flow passage block 2 side (downward in FIG. 1) by the movement of the diaphragm holder 4, a gap formed between the apex of the diaphragm 3 and the valve seat 24 (in other words, the Cv value) is made smaller.

On the other hand, as the adjusting screw 8 is rotated in the other direction (for example, in the counterclockwise direction) by using the first rotary jig 10, the adjusting screw 8 is moved toward the actuator 5 side (upward in FIG. 1) while being loosened with respect to the internal thread 63 of the bonnet 6. By doing so, the diaphragm holder 4 is moved toward the actuator 5 side (upward in FIG. 1) by a restoring force of the diaphragm 3, and thereby, the gap formed between the apex of the diaphragm 3 and the valve seat 24 (in other words, the Cv value) is increased.

As described above, the adjusting screw 8 can adjust the Cv value at the time of assembly of the valve device 1 by adjusting the valve opening position of the diaphragm 3 via the diaphragm holder 4 correspondingly to the screwed amount of the adjusting screw 8 with respect to the internal thread 63 of the bonnet 6. Therefore, when the valve device 1 is fully opened, it is possible to suppress the variation in the flow rate of the fluid flowing through the fluid inflow flow passage 21 and the fluid outflow flow passage 22.

Furthermore, the movement of the diaphragm holder 4 toward the flow passage block 2 side (downward in FIG. 1) is restricted by the contact between the lower surface 412 serving as a movement restricting surface of the holder main body 41 and the upper surface of the spacer 7. With such a configuration, it is possible to suppress both of excessive screwing of the adjusting screw 8 into the internal thread 63 while making the gap formed between the apex of the diaphragm 3 and the valve seat 24 (in other words, the Cv value) smaller excessively and excessive pressing of the diaphragm 3 against the valve seat 24 by the diaphragm holder 4 when the valve device 1 is closed.

The lock nut 9 is a ring-shaped lock member that locks the adjusting screw 8 after the valve opening position of the diaphragm 3 has been adjusted. In addition, the lock nut 9 is provided along the vertical direction between the extended portion 514 of the actuator 5 and the adjusting screw 8. In this embodiment, the stem 54 of the actuator 5 is inserted through the inner circumferential side of the lock nut 9. However, the present invention is not limited thereto, and for example, the upper projecting portion 42 of the diaphragm holder 4 may be inserted through the lock nut 9, or the stem 54 and the upper projecting portion 42 may be inserted so as to come into contact with each other.

On an outer circumferential surface of the lock nut 9, an external thread 91 that is threaded to the internal thread 63 of the bonnet 6 is formed. An end surface (a lower end surface in FIG. 1) of the lock nut 9 on the flow passage block 2 side comes into contact with an end surface of the large-diameter portion 81 of the adjusting screw 8.

As shown in FIGS. 1, 3, and 4, in an end surface (an upper end surface in FIG. 1) of the lock nut 9 on the actuator 5 side, second engagement portions 92 with which the second rotary jig 11 for rotating the lock nut 9 is to be engaged are formed. As shown in FIGS. 1 and 3, the second engagement portions 92 are formed of a pair of engagement holes 921.

As shown in FIG. 4, the second rotary jig 11 has a cylindrical jig main body 111, a hexagonal projected portion 112 that is provided on an outer circumferential surface of the one end of the jig main body 111 and that can engage with the hexagonal wrench, and a pair of projections 113 that project from other end of the jig main body 111 and that can engage with a pair of engagement holes 921. Because the jig main body 111 of the second rotary jig 11 is formed with a through hole through which the first rotary jig 10 can be inserted, it is possible to use the first rotary jig 10 by inserting it through an inner circumferential side of the jig main body 111 of the second rotary jig 11.

The lock nut 9 is screwed into the internal thread 63 of the bonnet 6 by being rotated in one direction (for example, in the clockwise direction) by the second rotary jig 11. By doing so, the lock nut 9 can lock the adjusting screw 8, and so, it is possible to suppress the variation in the Cv value due to the loosening of the adjusting screw 8. Therefore, when the valve device 1 is fully opened, it is possible to further suppress the variation in the flow rate of the fluid flowing through the fluid inflow flow passage 21 and the fluid outflow flow passage 22.

In addition, the first engagement portions 83 that engage with the first rotary jig 10 are formed in a region of the adjusting screw 8 that does not overlap with the lock nut 9 in a top view, and the second engagement portions 92 that engage with the second rotary jig 11 are formed in a region of the lock nut 9 that overlaps with the adjusting screw 8 in a top view. With such a configuration, the first rotary jig 10 can engage with the first engagement portions 83 of the adjusting screw 8 without interfering with the lock nut 9, and at the same time, the second rotary jig 11 through which the first rotary jig 10 is inserted can engage with the second engagement portions 92 of the lock nut 9 (see FIG. 6).

In a state in which the rotation of the adjusting screw 8 is restricted by the first rotary jig 10, the lock nut 9 is screwed by the second rotary jig 11 to tighten and lock the adjusting screw 8 with a reliability. By doing so, the rotation (co-rotation) of the adjusting screw 8 caused by screwing the lock nut 9 can be suppressed, and therefore, it is possible to prevent the Cv value from being changed after the adjustment. Therefore, when the valve device 1 is fully opened, it is possible to further suppress the variation in the flow rate of the fluid flowing through the fluid inflow flow passage 21 and the fluid outflow flow passage 22.

The first engagement portions 83 of the adjusting screw 8 are located at the radially inward side from the second engagement portions 92 of the lock nut 9. With such a configuration, the first rotary jig 10 can engage with the first engagement portions 83 that are located at the radially inward side from the second engagement portions 92 by being inserted into the inner circumferential side of the lock nut 9 formed between the pair of engagement holes 921 (see FIG. 6).

As described above, it is possible to use the first rotary jig 10 and the second rotary jig 11 by engaging them with the first engagement portions 83 and the second engagement portions 92, respectively, at the same time without causing interference therebetween.

In this embodiment, the first engagement portions 83 and the second engagement portions 92 are formed in the region of the adjusting screw 8 that does not overlap with the lock nut 9 in a top view and in the region of the lock nut 9 that overlaps with the adjusting screw 8 in a top view, respectively. However, the present invention is not limited thereto, and for example, the first engagement portions 83 and the second engagement portions 92 may be formed in the region of the adjusting screw 8 that overlaps with the lock nut 9 in a top view and in the region of the lock nut 9 that overlaps with the adjusting screw 8 in a top view, respectively.

Furthermore, in a state in which the contact surface 512f of the actuator 5 and the positioning surface 64 of the bonnet 6 are in brought into contact by the threading between the external thread 515 of the extended portion 514 of the actuator 5 and the internal thread 63 of the bonnet 6, a clearance is formed between the extended portion 514 and the lock nut 9. With such a configuration, the contact between the extended portion 514 and the lock nut 9 can be avoided, and therefore, it is possible to perform the positioning of the actuator 5 with a high accuracy by causing the contact surface 512f and the positioning surface 64 to come into contact. In addition, it is possible to make the dimension of the valve device 1 in the vertical direction constant.

Next, a manufacturing method of the valve device 1 for manufacturing the valve device 1 will be described with reference to FIGS. 5 and 6.

Figure 5:
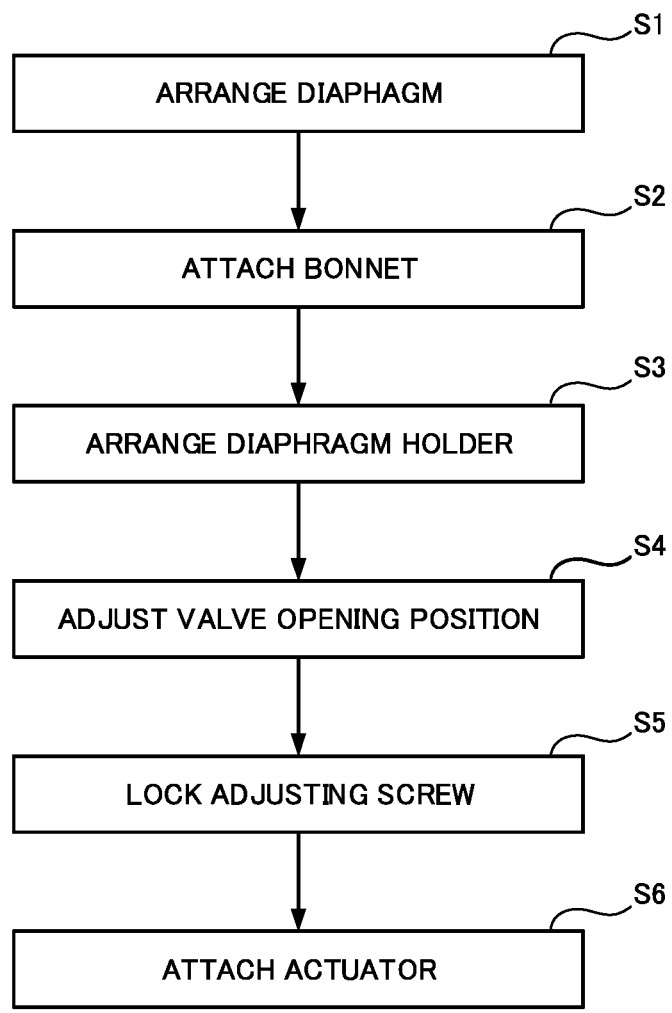
FIG. 5 is a flow chart showing a manufacturing method of the valve device for manufacturing the valve device.
Figure 6:
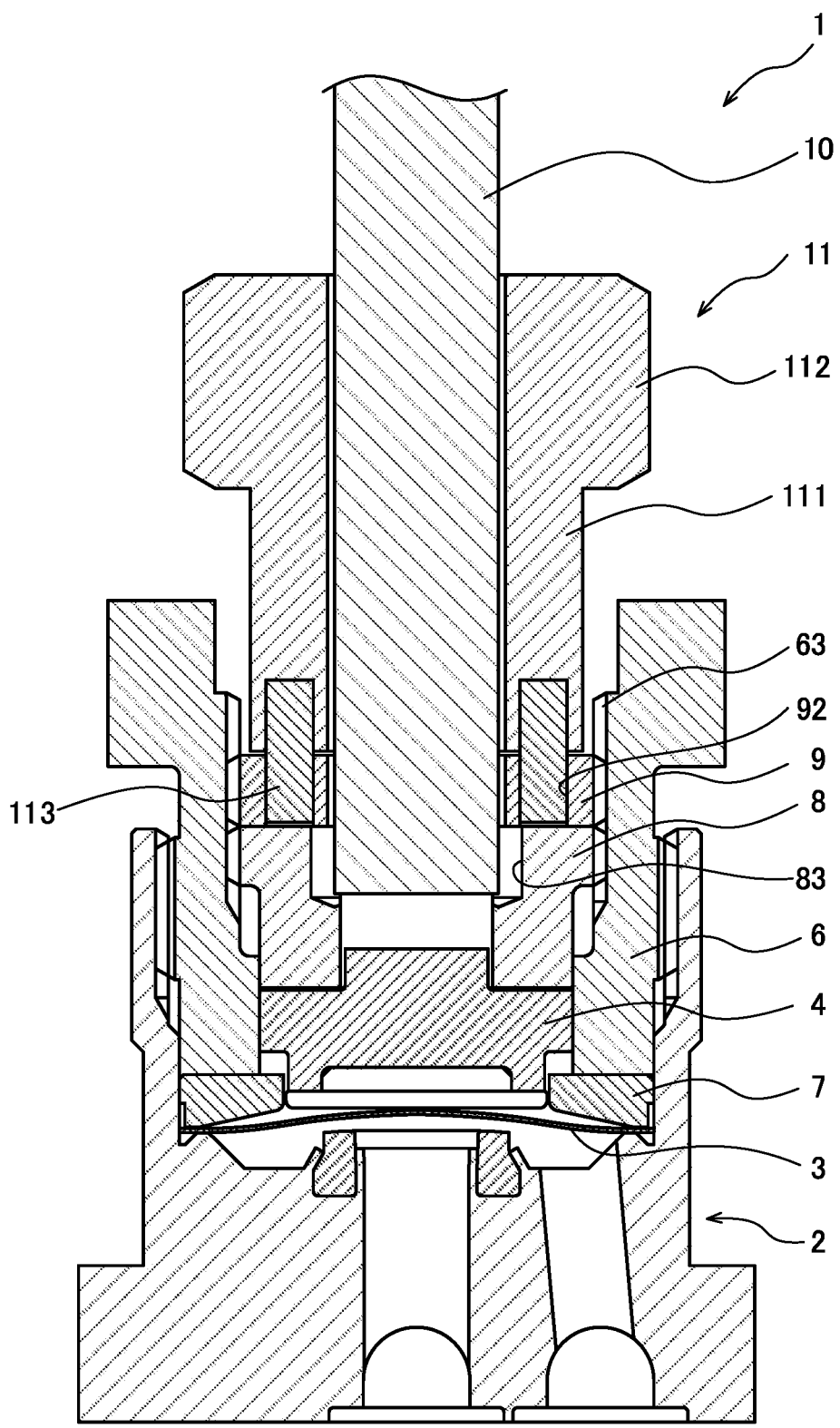
FIG. 6 is a schematic view showing a state in which the adjusting screw is locked by screwing the lock nut by the second rotary jig in a state in which rotation of the adjusting screw is restricted by the first rotary jig.

FIG. 5 is a flow chart showing the manufacturing method of the valve device 1 for manufacturing the valve device 1. FIG. 6 is a schematic view showing a state in which the adjusting screw 8 is being locked by screwing the lock nut 9 by using the second rotary jig 11 in a state in which the rotation of the adjusting screw 8 is restricted by the first rotary jig 10.

As shown in FIG. 5, in Step S1, the diaphragm 3 is first arranged on the flow passage block 2. Specifically, in Step S1, the diaphragm 3 is arranged on the bottom surface of the recessed portion 23 of the flow passage block 2 such that both of the fluid inflow flow passage 21 and the fluid outflow flow passage 22 are covered by the diaphragm 3.

Next, in Step S2, the bonnet 6 is attached to the flow passage block 2. Specifically, Step S2 includes a spacer mounting step in which the spacer 7 is mounted on the diaphragm 3 so as to cover the outer circumferential edge of the diaphragm 3 and a bonnet screwing step in which the bonnet 6 is screwed into the recessed portion 23 of the flow passage block 2 to fix the spacer 7 and the outer circumferential edge of the diaphragm 3.

Next, in Step S3, the diaphragm holder 4 is arranged on the bonnet 6 so as to come into contact with the diaphragm 3. Next, in Step S4, the valve opening position of the diaphragm 3 is adjusted via the diaphragm holder 4 by threading the adjusting screw 8 to the internal thread 63 of the bonnet 6 by using the first rotary jig 10. By doing so, it is possible to adjust the Cv value during the assembly of the valve device 1.

Next, in Step S5, the adjusting screw 8 is locked by screwing the lock nut 9 into the internal thread 63 of the bonnet 6 by using the second rotary jig 11. Specifically, in Step S5, as shown in FIG. 6, in a state in which the rotation of the adjusting screw 8 is restricted by the first rotary jig 10, the adjusting screw 8 is tightened and locked with a reliability by screwing the lock nut 9 by using the second rotary jig 11.

By doing so, the rotation (the co-rotation) of the adjusting screw 8 caused by screwing the lock nut 9 can be suppressed, and therefore, it is possible to prevent the Cv value from being changed after the adjustment. Therefore, when the valve device 1 is fully opened, it is possible to further suppress the variation in the flow rate of the fluid flowing through the fluid inflow flow passage 21 and the fluid outflow flow passage 22.

Finally, in Step S6, the actuator 5 is attached to the bonnet 6. Specifically, in Step S6, the extended portion 514 of the actuator 5 in an assembly state is screwed to the internal thread 63 of the bonnet 6 to cause the contact surface 512f of the actuator 5 to come into contact with the positioning surface 64 of the bonnet 6, and thereby, it is possible to perform the positioning of the actuator 5.

Next, operation of the valve device 1 will be described.

In a case in which the driving-air supply control unit supplies the driving air to the actuator 5 of the valve device 1 via the stem guide hole 511d, the driving air is introduced to the first air introduction chamber 56 via the axial direction flow passage 54a and the first radial flow passage 54b and is introduced to the second air introduction chamber 57 via the axial direction flow passage 54a and the second radial flow passage 54c.

With such a configuration, the piston 52 is moved upward in FIG. 1 together with the stem 54 against the biasing force exerted by the coil spring 53 such that volumes of the first air introduction chamber 56 and the second air introduction chamber 57 are increased. The diaphragm 3 is then moved away from the valve seat 24 by moving upwards together with the diaphragm holder 4 by its own restoring force. In other words, the diaphragm 3 opens the fluid inflow flow passage 21 by the upward movement of the piston 52 and the stem 54. Therefore, the fluid such as process gas, etc. is supplied to the fluid outflow flow passage 22 from the fluid inflow flow passage 21 via a gap formed between the valve seat 24 and the diaphragm 3.

On the other hand, in a case in which the driving-air supply control unit is not supplying the driving air to the actuator 5 of the valve device 1 via the stem guide hole 511d, the piston 52 is moved downward in FIG. 1 together with the stem 54 by the biasing force exerted by the coil spring 53. The diaphragm 3 is then pressed against the valve seat 24 via the diaphragm holder 4 by the downward movement of the stem 54. In other words, the diaphragm 3 closes the fluid inflow flow passage 21 by the movement of the piston 52, the stem 54, and the diaphragm holder 4. Therefore, the vaporized fluid such as process gas, etc. is not supplied from the fluid inflow flow passage 21 to the fluid outflow flow passage 22.

The volumes of the first air introduction chamber 56 and the second air introduction chamber 57 are reduced along with the movement of the piston 52 and the stem 54. At this time, the air in the first air introduction chamber 56 is discharged to the driving-air supply control unit via the first radial flow passage 54b, the axial direction flow passage 54a, and the stem guide hole 511d, and the air in the second air introduction chamber 57 is discharged to the driving-air supply control unit via the second radial flow passage 54c, the axial direction flow passage 54a, and the stem guide hole 511d.

As described above, in the driving-air supply control unit, by controlling the supply of the driving air to the actuator 5 of the valve device 1, it is possible to switch the opened state and closed state of the diaphragm 3 with respect to the valve seat 24. Therefore, according to the valve device 1 as described above, it is possible to control the supply of the fluid from the fluid inflow flow passage 21 to the fluid outflow flow passage 22. In this embodiment, the valve device 1 is a valve device of a constantly closed type (normally closed type). However, the present invention is not limited thereto, and for example, the valve device 1 may be a valve device of a constantly opened type (normally opened type).

Next, an example of the fluid control device to which the valve device 1 according to this embodiment is applied will be described with reference to FIG. 7.

Figure 7:
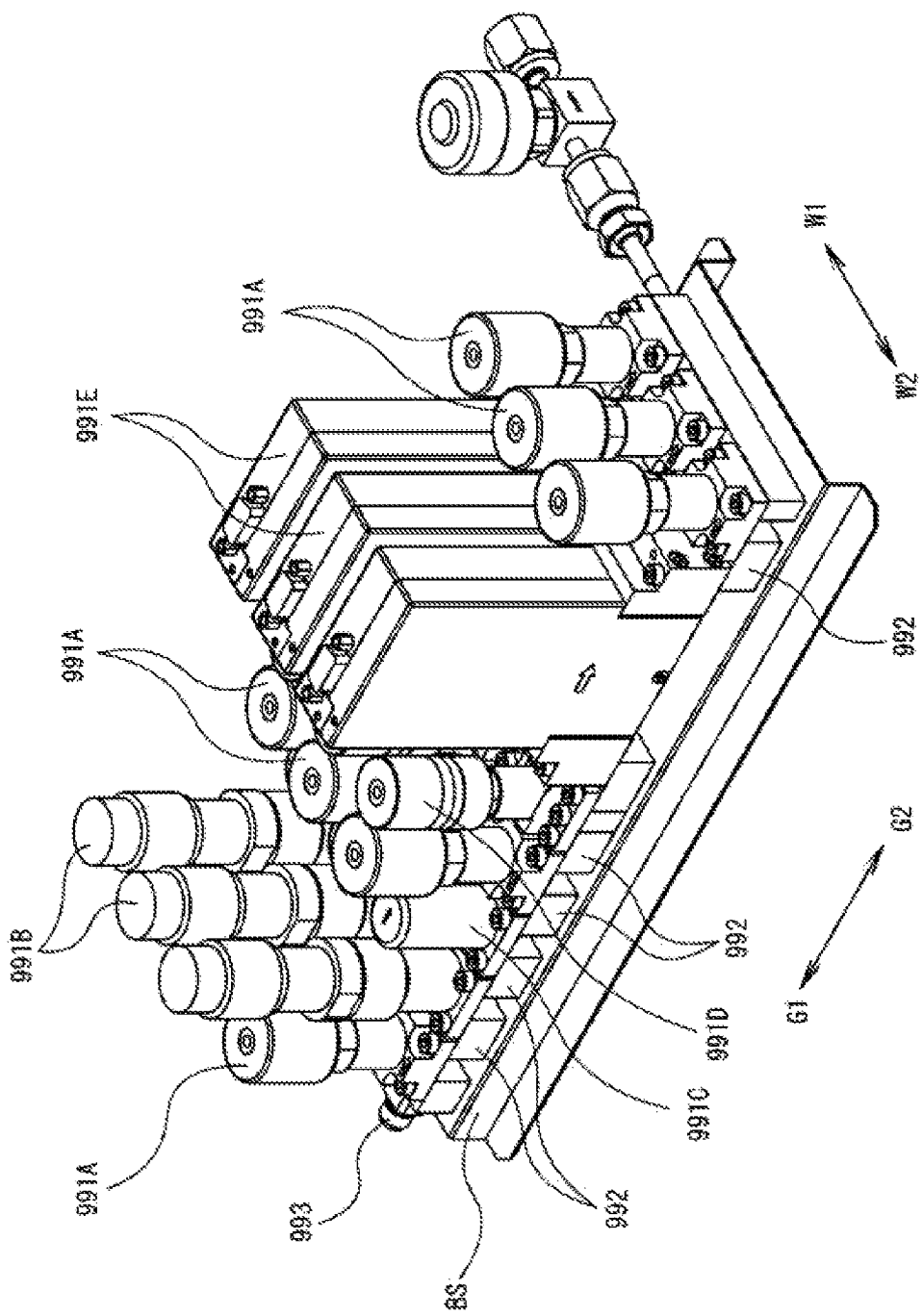
FIG. 7 is a perspective view showing an example of a fluid control device to which the valve device is applied.

FIG. 7 is a perspective view showing an example of the fluid control device to which the valve device 1 is applied.

The fluid control device shown in FIG. 7 is provided with a metallic base plate BS that is arranged along the width directions W1 and W2 and that is extended in the longitudinal directions G1 and G2. W1 refers to the front side direction, W2 refers to the back side direction, G1 refers to the upstream side direction, and G2 refers to the downstream side direction. Various fluid apparatuses 991A to 991E are mounted on the base plate BS via a plurality of flow passage blocks 992, and flow passages (not shown) through which the fluid flows from the upstream side G1 toward the downstream side G2 are respectively formed by the plurality of flow passage blocks 992.

In the above, "the fluid apparatus" is an apparatus that is used for the fluid control device for controlling the flow of the fluid, and such an apparatus includes a body that defines the fluid flow passages and has at least two flow passage openings that open at a surface of the body. Specifically, the open/close valves (two-way valves) 991A, regulators 991B, pressure gauges 991C, open/close valves (three-way valves) 991D, mass flow controllers 991E, and so forth are included; however, the present invention is not limited thereto. An introduction pipe 993 is connected to the flow passage opening of the above-described flow passages (not shown) on the upstream side.

The valve device 1 according to this embodiment can be applied to the various valve devices such as the open/close valves 991A and 991D, the regulators 991B, and so forth described above.

Next, operational advantages according to this embodiment will be described.

The valve device 1 according to this embodiment is provided with: the flow passage block 2 in which the fluid inflow flow passage 21 is formed; the diaphragm 3 configured to open and close the fluid inflow flow passage 21; the diaphragm holder 4 configured to hold the diaphragm 3; the actuator 5 configured to push down the diaphragm 3 via the diaphragm holder 4; the cylindrical bonnet 6 formed with the internal thread 63 on the inner circumferential surface, the bonnet 6 being configured to join the flow passage block 2 and the actuator 5; the cylindrical adjusting screw 8 threaded to the internal thread 63, the adjusting screw 8 being configured to come into contact with the diaphragm holder 4 to adjust the valve opening position of the diaphragm 3; and the annular lock nut 9 configured to lock the adjusting screw 8 by being screwed into the internal thread 63.

The fluid control device according to this embodiment is the fluid control device including the plurality of fluid apparatuses arranged from the upstream side toward the downstream side, wherein the plurality of fluid apparatuses includes the valve device 1 described above.

The manufacturing method of the valve device 1 for manufacturing the valve device 1 according to this embodiment includes: a diaphragm arranging step of arranging the diaphragm 3 to the flow passage block 2 in which the fluid inflow flow passage 21 is formed, the diaphragm 3 being configured to open and close the fluid inflow flow passage 21; a bonnet attaching step of attaching the cylindrical bonnet 6 to the flow passage block 2, the bonnet 6 being formed with the internal thread 63 on the inner circumferential surface thereof; a diaphragm-holder arranging step of arranging the diaphragm holder 4 on the bonnet 6 so as to come into contact with the diaphragm 3; a valve-opening-position adjusting step of adjusting the valve opening position of the diaphragm 3 via the diaphragm holder 4 by threading the cylindrical adjusting screw 8 to the internal thread 63; a locking step of locking an adjusting screw by screwing the ring-shaped lock nut 9 to the internal thread 63; and an actuator attaching step of attaching the actuator 5 to the bonnet 6, the actuator 5 being configured to push down the diaphragm 3 via the diaphragm holder 4.

According to such a configuration, the adjusting screw 8 can adjust the adjusting screw 8 can adjust the Cv value at the time of assembly of the valve device 1 by adjusting the valve opening position of the diaphragm 3 via the diaphragm holder 4 in accordance with the screwed amount of the adjusting screw 8 to the internal thread 63 of the bonnet 6. In addition, because the adjusting screw 8 can be tightened and locked by screwing the lock nut 9, it is possible to suppress the variation in the Cv value due to the loosening of the adjusting screw 8. Therefore, when the valve device 1 is fully opened, it is possible to further suppress the variation in the flow rate of the fluid flowing through the fluid inflow flow passage 21 and the fluid outflow flow passage 22.

In addition, in this embodiment, the first engagement portions 83 are formed in the region of the adjusting screw 8 that does not overlap with the lock nut 9, the first engagement portions 83 being configured such that the first rotary jig 10 is engaged with the first engagement portions 83, and the second engagement portions 92 are formed in the lock nut 9, the second engagement portions 92 being configured such that the second rotary jig 11 is engaged with the second engagement portions 92.

According to such a configuration, the first rotary jig 10 can engage with the first engagement portions 83 of the adjusting screw 8 without interfering with the lock nut 9, and at the same time, the second rotary jig 11 can engage with the second engagement portions 92 of the lock nut 9.

In addition, in this embodiment, the first engagement portions 83 are positioned at the radially inward side from the second engagement portions 92.

According to such a configuration, the first rotary jig 10 can engage with the first engagement portions 83 that are located at the radially inward side from the second engagement portions 92 by being inserted into the inner circumferential side of the lock nut 9 formed between the pair of engagement holes 921.

In addition, in this embodiment, the actuator 5 has the case 51, the case 51 has: the cylindrical extended portion 514 provided so as to extend toward the flow passage block 2 side, the extended portion 514 being formed with the external thread 515 on the outer circumferential surface, and the external thread 515 being configured to be threaded to the internal thread 63; and the ring-shaped contact surface 512*f* located at the outer circumferential side from the extended portion 514, the contact surface 512*f* facing the bonnet 6, the bonnet 6 is formed with the ring-shaped positioning surface 64 facing the contact surface 512*f*, and the clearance is formed between the extended portion 514 and the lock nut 9 in a state in which the contact surface 512*f* and the positioning surface 64 are brought into contact by threading the external thread 515 and the internal thread 63.

According to such a configuration, the contact between the extended portion 514 and the lock nut 9 can be avoided, and therefore, it is possible to perform the positioning of the actuator 5 with a high accuracy by causing the contact surface 512*f* and the positioning surface 64 to come into contact. In addition, it is possible to make the dimension of the valve device 1 in the vertical direction constant.

In addition, in this embodiment, the annular portion 65 is formed on the lower end of the bonnet 6 located on the flow passage block 2 side, the annular portion 65 having the inner diameter that is smaller than the inner diameter of the internal thread 63, the ring-shaped spacer 7 is provided between the lower end and the flow passage block 2, the spacer 7 having the inner diameter that is smaller than the inner diameter of the annular portion 65, the diaphragm holder 4 has: the holder main body 41 having the lower surface 412 facing the spacer 7, the holder main body 41 being configured to be guided by the annular portion 65; the lower projecting portion 43 configured to be inserted into the inner circumferential side of the spacer 7, the lower projecting portion 43 being located at the flow passage block 2 side from the holder main body 41, and the movement of the diaphragm holder 4 toward the flow passage block 2 side is restricted by the contact between the lower surface 412 of the holder main body 41 and the spacer 7.

According to such a configuration, it is possible to suppress excessive screwing of the adjusting screw 8 into the internal thread 63 while making the gap formed between the apex of the diaphragm 3 and the valve seat 24 (in other words, the Cv value) smaller excessively In addition, in this embodiment, in the locking step, the adjusting screw 8 is locked by threading the lock nut 9 to the internal thread 63 in a state in which the rotation of the adjusting screw 8 is restricted.

According to such a configuration, the rotation (the co-rotation) of the adjusting screw 8 caused by screwing the lock nut 9 can be suppressed, and therefore, it is possible to prevent the Cv value from being changed after the adjustment. Therefore, when the valve device 1 is fully opened, it is possible to further suppress the variation in the flow rate of the fluid flowing through the fluid inflow flow passage 21 and the fluid outflow flow passage 22.

Embodiments of this invention were described above, but the above embodiments are merely examples of applications of this invention, and the technical scope of this invention is not limited to the specific constitutions of the above embodiments.

(First Modification)

Next, a valve device 1*a* according to a first modification will be described with reference to FIG. 8. In this modification, the description of the configurations that are the same as those in the above-described embodiment is omitted, and the differences with respect to the embodiment described above will be mainly described.

Figure 8:
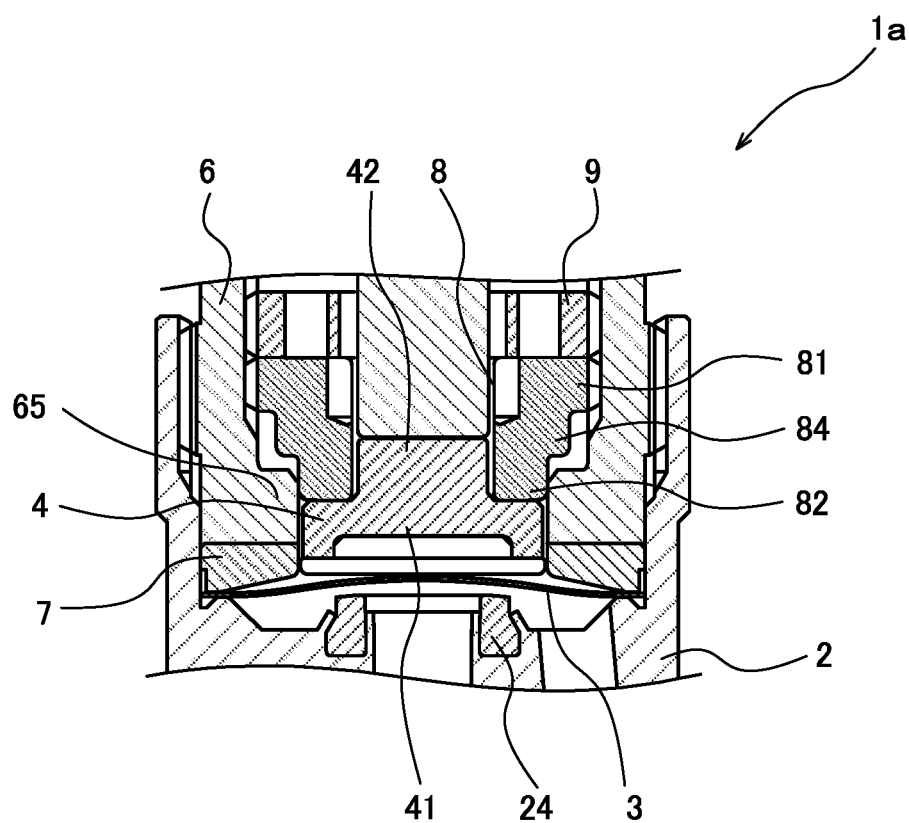
FIG. 8 is a sectional view showing a relevant portion of the valve device according to a first modification.

FIG. 8 is a sectional view showing a relevant portion of the valve device 1*a* according to the first modification.

In the above-described embodiment, the screwed amount of the adjusting screw 8 is restricted by the contact between the lower surface 412 of the holder main body 41 and the spacer 7. However, the present invention is not limited thereto, and for example, as shown in FIG. 8, the screwed amount may be restricted by the contact between a middle diameter portion 84 serving as a screwed amount restricting portion of the adjusting screw 8 and the annular portion 65.

As shown in FIG. 8, in this modification, the adjusting screw 8 has, in addition to the large-diameter portion 81 and the small-diameter portion 82, the ring-shaped middle diameter portion 84 having the outer diameter that is smaller than the outer diameter of the large-diameter portion 81, but larger than the outer diameter of the small-diameter portion 82. The middle diameter portion 84 is provided between the large-diameter portion 81 and the small-diameter portion 82 along the vertical direction so as to face the annular portion 65 of the bonnet 6.

With the valve device 1*a* according to this modification, similarly to the above-described embodiment, it is possible to suppress excessive screwing of the adjusting screw 8 into the internal thread 63. In addition, it is possible to make the ring-shaped spacer 7 to have the inner diameter that is same as the inner diameter of the annular portion 65, and it is possible to omit the lower projecting portion 43 of the diaphragm holder 4 in the above-described embodiment, thereby achieving simplification of the configuration of the diaphragm holder 4 (see FIG. 8).

(Second Modification)

Next, a valve device 1*b* according to a second modification will be described with reference to FIG. 9. In this modification, the description of the configurations that are the same as those in the above-described embodiment is omitted, and the differences with respect to the embodiment described above will be mainly described.

Figure 9:
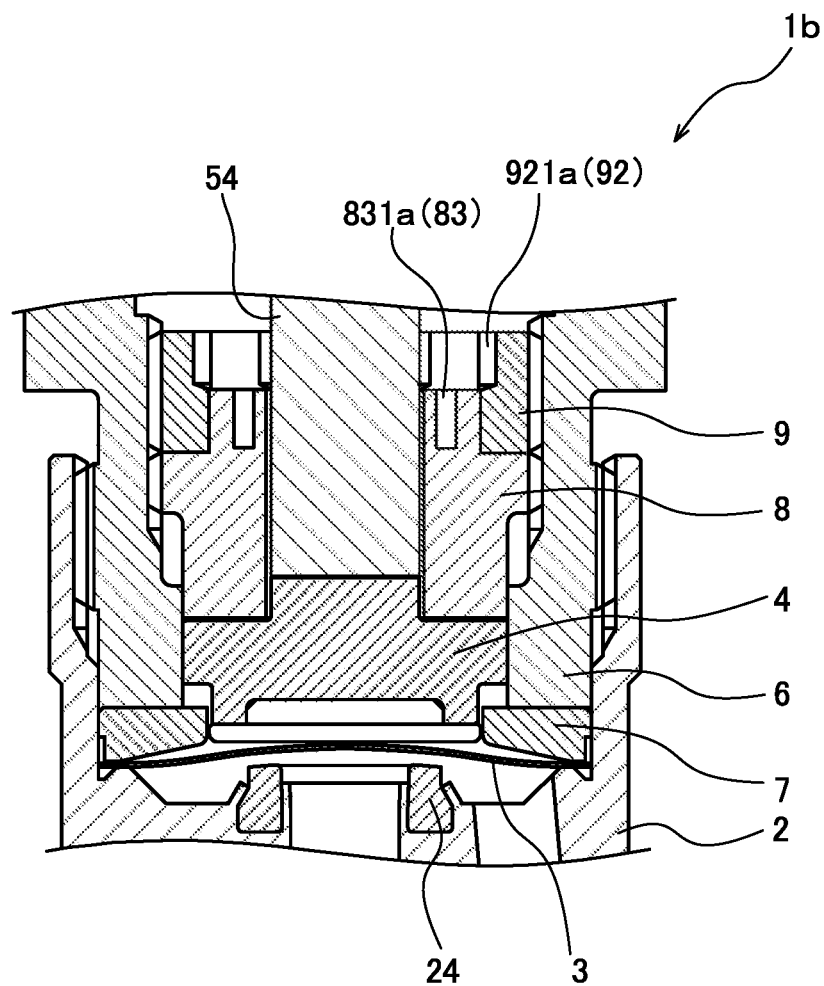
FIG. 9 is a schematic sectional view of a relevant portion of the valve device according to a second modification.

FIG. 9 is a sectional view showing a relevant portion of the valve device 1*b* according to the second modification.

In the above-described embodiment, the adjusting screw 8 and the lock nut 9 are provided so as not be overlapped along the vertical direction. However, the present invention is not limited thereto, and for example, as shown in FIG. 9, the adjusting screw 8 and the lock nut 9 may be provided so as to be overlapped along the vertical direction.

As shown in FIG. 9, in this modification, the first engagement portions 83 are formed of a pair of engagement holes 831*a* that are formed in an end surface of the adjusting screw 8 on the actuator 5 side. The second engagement portions 92 are formed of six semicircular recessed grooves 921*a* that are formed in an inner circumferential surface of the lock nut 9 at predetermined intervals in a top view. As described above, the first engagement portions 83 and the second engagement portions 92 may not necessarily be formed of the six semicircular recessed grooves 831 and the pair of engagement holes 921, respectively.

With the valve device 1*b* according to this modification, by providing the adjusting screw 8 and the lock nut 9 so as to be overlapped along the vertical direction, it is possible to reduce the dimension of the bonnet 6 accommodating the adjusting screw 8 and the lock nut 9 in the vertical direction. Therefore, it is possible to achieve reduction in the size of the valve device 1.

This application claims priority based on Japanese Patent Application No. 2019-141073 filed with the Japan Patent Office on Jul. 31, 2019, the entire contents of which are incorporated into this specification.

What is claimed is:

1. A valve device comprising:
   a flow passage block in which a flow passage is formed;
   a diaphragm configured to open and close the flow passage;
   a diaphragm holder configured to hold the diaphragm;

an actuator configured to push down the diaphragm via the diaphragm holder;

a tubular bonnet formed with an internal thread on an inner circumferential surface, the bonnet being fixed to the flow passage block so as to join the flow passage block and the actuator;

a tubular position adjusting member being screwed into the internal thread, to press the diaphragm holder against the diaphragm side, thereby adjusting a valve opening position of the diaphragm; and an annular lock nut configured to lock the position adjusting member by being screwed into the internal thread.

2. The valve device according to claim 1, wherein the actuator has a case, the case has:

a tubular extended portion provided so as to extend toward the flow passage block side, the extended portion being formed with an external thread on an outer circumferential surface, and the external thread being configured to be threaded to the internal thread; and an annular contact surface located at outer circumferential side from the extended portion, the contact surface facing the bonnet, the bonnet is formed with an annular positioning surface facing the contact surface, and a clearance is formed between the extended portion and the lock nut in a state in which the contact surface and the positioning surface are brought into contact by threading the external thread and the internal thread.

3. The valve device according to claim 1, wherein an annular portion is formed on an end portion of the bonnet located on the flow passage block side, the annular portion having an inner diameter smaller than an inner diameter of the internal thread, an annular spacer is provided between the end portion and the flow passage block, the spacer having an inner diameter smaller than the inner diameter of the annular portion, the diaphragm holder has:

a guided portion having a movement restricting surface facing the spacer, the guided portion being configured to be guided by the annular portion; and an insertion portion configured to be inserted into an inner circumferential side of the spacer, the insertion portion being located at the flow passage block side from the guided portion, and movement of the diaphragm holder toward the flow passage block side is restricted by contact between the movement restricting surface of the guided portion and the spacer.

4. The valve device according to claim 1, wherein an annular portion is formed on an end portion of the bonnet on the flow passage block side, the annular portion having an inner diameter smaller than an inner diameter of the internal thread, the position adjusting member has:

a threaded portion threaded to the internal thread; and a screwed amount restricting portion located at the flow passage block side from the threaded portion so as to face the annular portion, and a screwed amount of the position adjusting member is restricted by contact between the screwed amount restricting portion and the annular portion.

5. A fluid control device comprising a plurality of fluid apparatuses arranged from an upstream side toward a downstream side, wherein the plurality of fluid apparatuses include the valve device according to claim 1.

6. A valve device comprising:

a flow passage block in which a flow passage is formed;

a diaphragm configured to open and close the flow passage;

a diaphragm holder configured to hold the diaphragm;

an actuator configured to push down the diaphragm via the diaphragm holder;

a tubular bonnet formed with an internal thread on an inner circumferential surface, the bonnet being configured to join the flow passage block and the actuator;

a tubular position adjusting member threaded to the internal thread, the position adjusting member being configured to come into contact with the diaphragm holder to adjust a valve opening position of the diaphragm; and an annular lock nut configured to lock the position adjusting member by being screwed into the internal thread;

wherein a first engagement portion is formed in a region of the position adjusting member that does not overlap with the lock nut, the first engagement portion being configured such that a first rotary jig is engaged with the first engagement portion, and a second engagement portion is formed in the lock nut, the second engagement portion being configured such that a second rotary jig is engaged with the second engagement portion.

7. The valve device according to claim 6, wherein the first engagement portion is located at radially inward side from the second engagement portion.

8. A manufacturing method of a valve device for manufacturing the valve device, the manufacturing method comprising:

a diaphragm arranging step of arranging a diaphragm to a flow passage block in which a flow passage is formed, the diaphragm being configured to open and close the flow passage;

a bonnet fixing step of fixing a tubular bonnet to the flow passage block, the bonnet being formed with an internal thread on an inner circumferential surface thereof;

a diaphragm-holder arranging step of arranging a diaphragm holder on the bonnet so as to come into contact with the diaphragm;

a valve-opening-position adjusting step of adjusting a valve opening position of the diaphragm via the diaphragm holder by screwing a tubular position adjusting member into the internal thread to press the diaphragm holder against the diaphragm side;

a locking step of locking the position adjusting member by screwing an annular lock nut to the internal thread; and an actuator attaching step of attaching an actuator to the bonnet, the actuator being configured to push down the diaphragm via the diaphragm holder.

9. The manufacturing method of the valve device according to claim 8, wherein in the locking step, the position adjusting member is locked by screwing the lock nut into the internal thread in a state in which rotation of the position adjusting member is restricted.

* * * * *